(12) United States Patent
Legg

(10) Patent No.: US 8,578,636 B2
(45) Date of Patent: Nov. 12, 2013

(54) METHOD AND APPARATUS FOR THREADLESS, HAMMERLESS SELF-ALIGNING, GEOMETRIC DEVICE

(76) Inventor: George Alfred Legg, Hico, WV (US)

( * ) Notice: Subject to any disclaimer, the term of this patent is extended or adjusted under 35 U.S.C. 154(b) by 311 days.

(21) Appl. No.: 12/975,539

(22) Filed: Dec. 22, 2010

(65) Prior Publication Data
US 2011/0146052 A1    Jun. 23, 2011

Related U.S. Application Data

(60) Provisional application No. 61/289,151, filed on Dec. 22, 2009.

(51) Int. Cl.
*E02F 9/28* (2006.01)
(52) U.S. Cl.
USPC .................. 37/453; 37/457; 37/458; 403/223
(58) Field of Classification Search
USPC ........................... 29/229, 231, 236, 255, 278; 403/374.1–374.4, 409.1; 37/452, 456, 37/457, 458; 172/713
See application file for complete search history.

(56) References Cited

U.S. PATENT DOCUMENTS

| | | | | |
|---|---|---|---|---|
| 3,085,635 A * | 4/1963 | Livermore | ..................... | 172/699 |
| 4,428,131 A * | 1/1984 | Hahn | ............................... | 37/453 |
| 4,848,013 A * | 7/1989 | Bowman et al. | ................ | 37/457 |
| 5,205,057 A * | 4/1993 | Garman | .......................... | 37/458 |
| 5,272,824 A * | 12/1993 | Cornelius | ....................... | 37/458 |
| 7,121,023 B2 * | 10/2006 | Robinson et al. | ............... | 37/456 |
| 2002/0023375 A1 * | 2/2002 | Pippins | .......................... | 37/457 |
| 2012/0051836 A1 * | 3/2012 | Jakubisin | ...................... | 403/376 |
| 2012/0055052 A1 * | 3/2012 | Campomanes et al. | ........ | 37/456 |

* cited by examiner

*Primary Examiner* — Minh Trinh
(74) *Attorney, Agent, or Firm* — Dinsmore & Shohl LLP; Monika J. Hussell, Esq.

(57) ABSTRACT

A threadless, hammerless self-aligning geometric device for ground engagement, the device may comprise a wedge mechanism having a pair of laterally spaced holes in a first and second sidewall with a semi-flexible buffer that connects a plurality of load bearings that are axially aligned within the center of the wedge mechanism, wherein a pin that is formed integrally with an indentation is disposed in a rectangular mechanism having a recess with a pair of laterally spaced holes in a first and second sidewall so when fastened by the pin, the laterally spaced holes, the wedge mechanism and the recess are in substantial axial alignment, the pin being held in place by a mechanical fit between the pin and a knob.

10 Claims, 3 Drawing Sheets

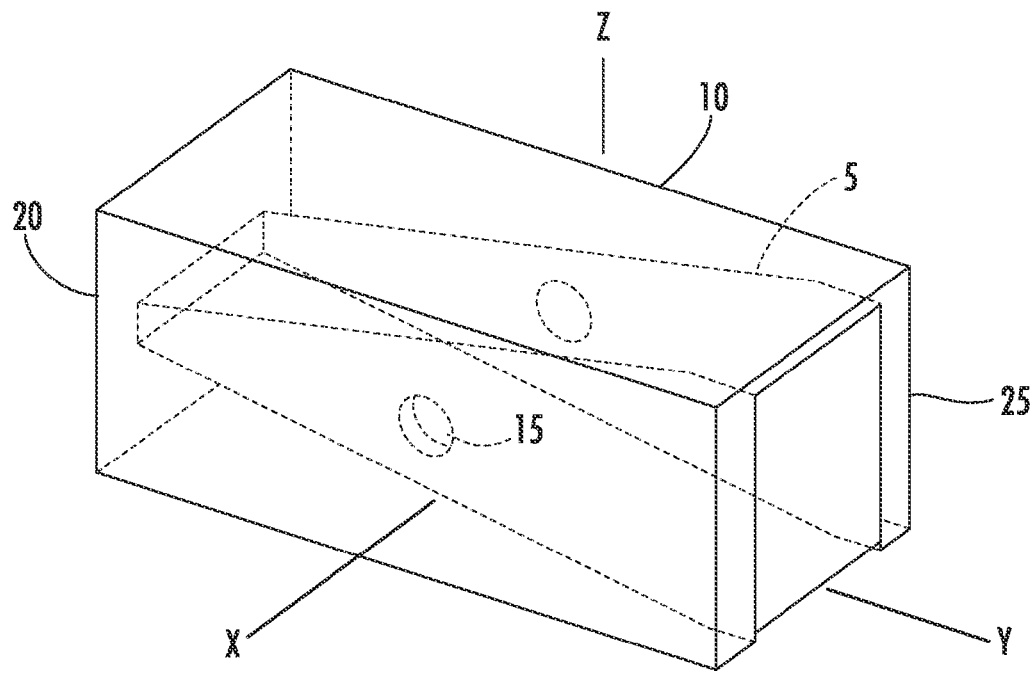
FIG. 1
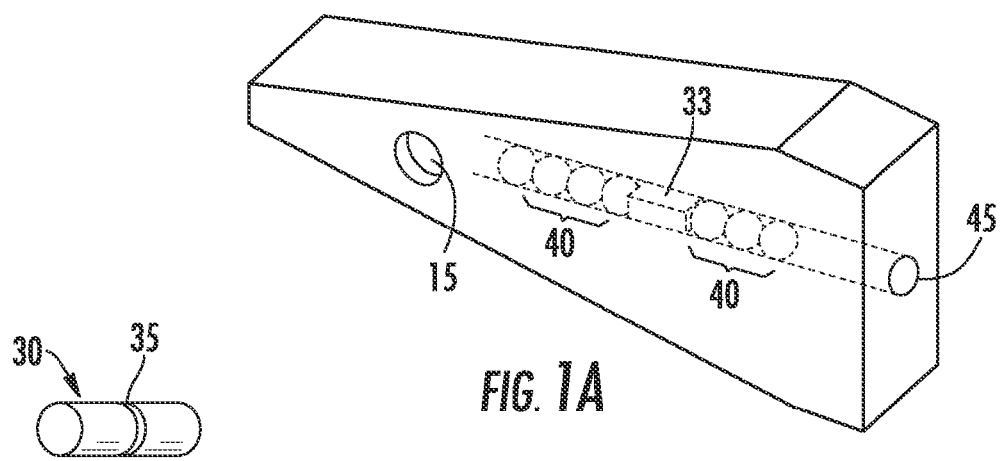
FIG. 1A
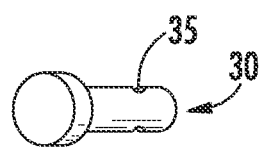
FIG. 2A
FIG. 2

METHOD AND APPARATUS FOR THREADLESS, HAMMERLESS SELF-ALIGNING, GEOMETRIC DEVICE

CROSS REFERENCE TO RELATED APPLICATIONS

The present application claims the benefit of U.S. Provisional Application No. 61/289,151, filed Dec. 22, 2009, which is incorporated herein by reference in its entirety.

BACKGROUND

The present application generally relates to threadless devices. The present application more particularly relates to threadless, hammerless, self-aligning geometric devices for ground engagement.

Conventionally, a hammer is used to drive a pin. A hammer can cause injury or lead to other liabilities. It also requires an additional tool to be present in order for ground engagement. Conventionally, threads are used within devices to attach different pieces together. However, threads tend to corrode easily. Threads also have the tendency to get stuck to the other parts of the device, making assembly/disassembly challenging and difficult.

Threadless, hammerless devices allow for quick and easy installation of ground-engaging devices. There is no need for an additional tool, i.e., a hammer. There are also no threads that can cause corrosion.

SUMMARY

The present application relates to a threadless, hammerless self-aligning geometric device for ground engagement. The device may comprise a wedge mechanism having a pair of laterally spaced holes in a first and second sidewall with a semi-flexible buffer that connects a plurality of load bearings that are axially aligned within the center of the wedge mechanism, wherein a pin that is formed integrally with an indentation is disposed in a rectangular mechanism having a recess with a pair of laterally spaced holes in a first and second sidewall so when fastened by the pin, the laterally spaced holes, the wedge mechanism and the recess are in substantial axial alignment, the pin being held in place by a mechanical fit between the pin and a knob.

The present application also relates to a method for ground engagement using a threadless, hammerless, self-aligning geometric device. The method may comprise inserting a wedge mechanism into a rectangular mechanism by aligning laterally spaced holes of the wedge mechanism with laterally spaced holes of a recess in the rectangular mechanism; fastening the wedge mechanism to the rectangular mechanism with a pin that is formed integrally with an indentation, whereby the pin is rotated 180° by a knob to secure the wedge mechanism to the rectangular mechanism, allowing for ground engagement.

The present application further relates to a threadless, hammerless, self-aligning geometric device for ground engagement. The device may comprise a shank having a plurality of apertures and an edge, where the edge may comprise a groove. The groove is slidably aligned with a dovetail, the dovetail having a first and second side. A first pin may be inserted into an aperture on the shank to connect the first side of the dovetail to the shank. The tooth has an opening, where the opening may fit over the shank. The tooth may then be fastened to the shank by a second pin secured to the second side of the dovetail.

BRIEF DESCRIPTION OF THE DRAWINGS

The present disclosure will become more fully understood from the following detailed description, taken in conjunction with the accompanying figures, wherein like reference numerals refer to like elements, in which:

FIG. 1 is a perspective view of the wedge mechanism axially aligned with a recess of a rectangular mechanism, according to an embodiment of the present disclosure;

FIG. 1A is a perspective view of a semi-flexible buffer, a plurality of load bearings within the center of the wedge mechanism, and, according to another embodiment, a laterally spaced aperture in the y-direction.

FIG. 2 is a perspective view of a knob, according to an embodiment of the present disclosure;

FIG. 2A is a perspective view of a pin with an indentation, according to another embodiment of the present disclosure;

DETAILED DESCRIPTION

Figure 2B:
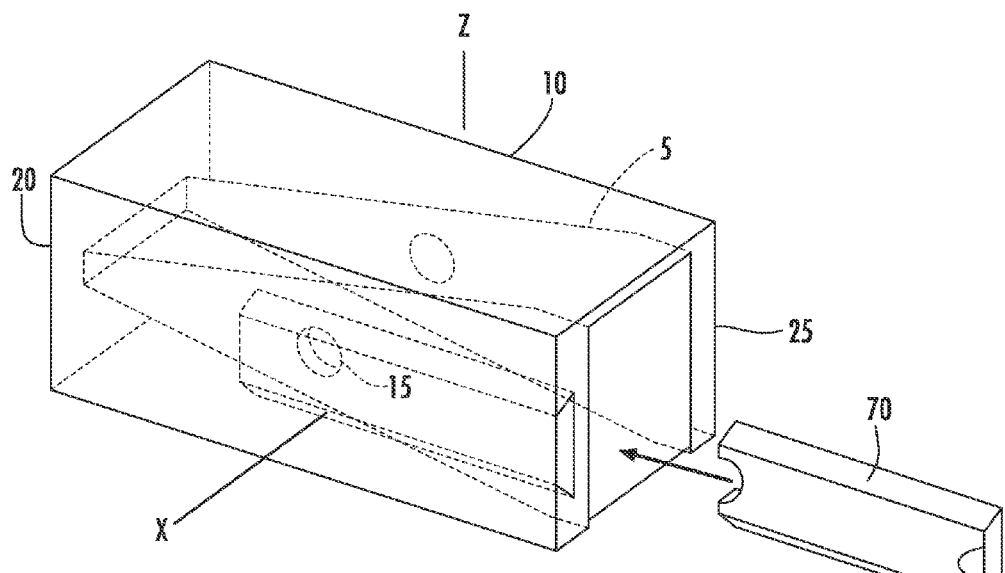
FIG. 2B is a perspective view of a pin with a spring-like mechanism that can be locked with a dovetail, according to another embodiment of the present disclosure.

Before turning to the figures, which illustrate several embodiments in detail, it should be understood that the application is not limited to the details or methodology set forth in the description or illustrated in the figures. It should also be understood that the terminology is for the purpose of description only and should not be regarded as limiting.

Referring to FIG. 1, a wedge mechanism 5, according to one embodiment, is axially aligned with a recess of a rectangular mechanism 10. As illustrated, the wedge mechanism 5 has a pair of laterally spaced apertures 15 in a first 20 and second sidewall 25. The rectangular mechanism 10 also has a pair of laterally spaced holes apertures (not shown) that axially align when the wedge mechanism 5 is inserted into the rectangular mechanism 10. In another embodiment, the wedge mechanism 5 may be inserted into the opposite end of the rectangular mechanism 10. Optionally, the axial alignment for the opening on the wedge mechanism 5 is in the x-direction.

Referring to FIG. 1A, the wedge mechanism 5 is shown with a semi-flexible buffer 33 that connects a plurality of load bearings 40 that are axially aligned within the center of the wedge mechanism 5. The plurality of load bearings 40 have the ability to bear the load, which allows the pin 30 (not shown) to remain free of distortion. Optionally, the wedge mechanism is shown to have an aperture 45 in the y-direction.

Referring to FIG. 2, a knob 32 is formed integrally with an indentation 35. Referring to FIG. 2A, a pin 30 is formed integrally with an indentation 35, according to another embodiment. The pin 30 is disposed in the rectangular mechanism 10 having a recess with a pair of laterally spaced apertures 15 in a first 20 and second sidewall 25. Optionally, the pin is rotated 180 degrees to fasten. The fastening of the pin 30 places the laterally spaced apertures 15 of the wedge mechanism 5 and the recess of the rectangular mechanism 10 in substantial axial alignment. The pin 30 is held in place by a mechanical fit between the difference in diameter between the pin 30 and its indentation 35. Optionally, the pin 30 may be turned by the knob 32 at 180 degrees. It is also optional to turn the knob 32 in an opposite direction to release the pin 30. In yet another option, the rotation of the knob 32 can also support the pin 30 being held in place. The pin 30 may also comprise a spring-like mechanism that can be locked with a dovetail 70 as shown in FIG. 2B.

Figure 3:
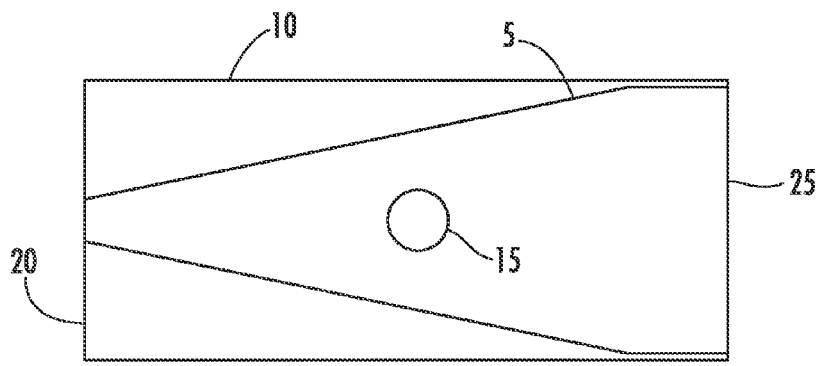
FIG. 3 is a simplified view of the wedge mechanism axially aligned with a recess of a rectangular mechanism, according to an embodiment of the present disclosure.

Referring to FIG. 3, the wedge mechanism 5 is placed within the recess of the rectangular mechanism 10. The aperture 15 is shown on one of the sidewalls 20, 25.

Referring to FIGS. 1-2A, a method for ground engagement is described. In FIG. 1A, the wedge mechanism 5 is inserted into the rectangular mechanism 10 by aligning laterally spaced apertures 15 of the wedge mechanism 5 with laterally spaced apertures 15 of a recess in the rectangular mechanism 10, as shown in FIG. 1. The pin 30 of FIG. 2A that is formed integrally with an indentation 35 fastens the wedge mechanism 5 to the rectangular mechanism 10. The pin 30 may be inserted into the aperture 15 aligned in the x-direction, shown in FIG. 1. The pin 30 of FIG. 2 is formed integrally with an indentation 35 fastens the wedge mechanism 5 to the rectangular mechanism 10. The pin 30 may be inserted into the aperture 15 aligned in the y-direction, shown in FIG. 1A. The pin 30 is then rotated 180 degrees by a knob to secure the wedge mechanism 5 to the rectangular mechanism 10, allowing for ground engagement.

Figure 4:
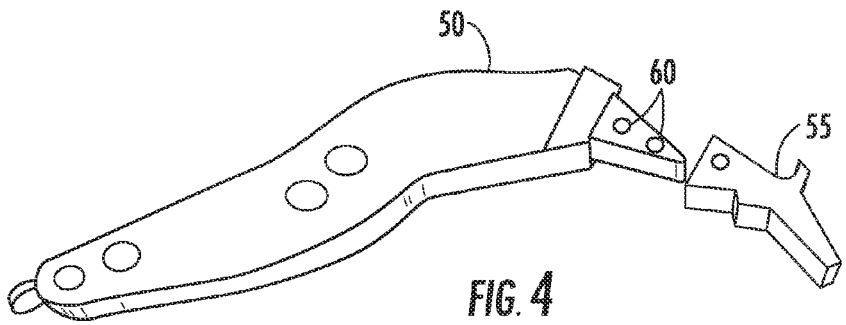
FIG. 4 is a perspective view of a shank and a tooth having an opening that fits over the shank, according to an embodiment of the present disclosure.
Figure 4A:
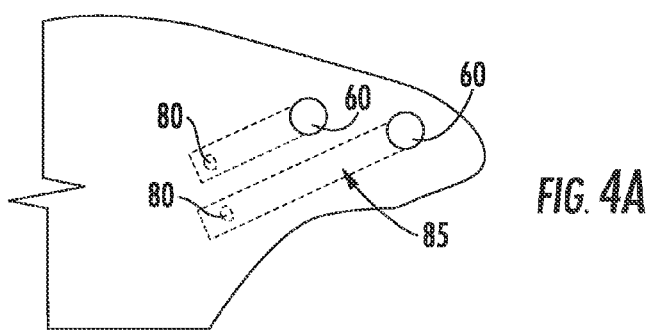
FIG. 4A is a close-up view of the shank having a plurality of dovetails slidably aligned with a groove, according to an embodiment of the present disclosure.
Figure 5:
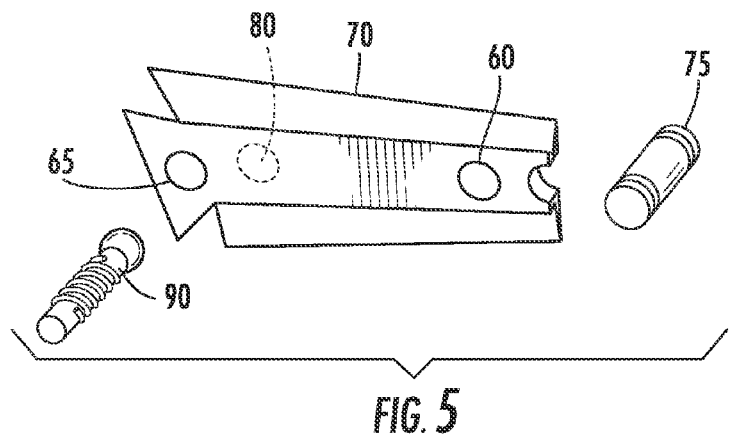
FIG. 5 is a close-up view of a dovetail sliding lock, according to an embodiment of the present disclosure.

Referring to FIGS. 4, 4A, and 5, a shank 50 has a plurality of apertures 60 and an edge, which has a groove 85 that is slidably aligned with a dovetail 70. The dovetail has a first and second side where a first pin 90 is inserted into an aperture 80 on the shank 50, which connects the first side of the dovetail 70 to the shank 50. The first pin 90 may comprise a spring mechanism. The tooth 55 has an opening that fits over the shank 50, whereby the tooth 55 is fastened to the shank 50 by a second pin 75 secured to the second side of the dovetail 70. In another embodiment, aperture 65 and aperture 80 are misaligned in order to create a locked dovetail 70.

While the present disclosure has been particularly shown and described with reference to specific embodiments, it should be understood by those skilled in the art that various changes in form and detail may be made therein without departing from the spirit and scope of the disclosure as defined by the appended claims.

What is claimed is:

1. A threadless, hammerless self-aligning geometric device for ground engagement, the device comprising: a wedge mechanism, a pin, and a rectangular mechanism, wherein said wedge mechanism comprises a pair of laterally spaced apertures in a first and second sidewall with a semi-flexible buffer that connects a plurality of load bearings that are axially aligned within the center of the wedge mechanism, wherein said pin is formed integrally with an indentation, wherein said pin is disposed in said rectangular mechanism, and wherein said rectangular mechanism comprises a recess with a pair of laterally spaced holes in a first and second sidewall so when fastened by the pin, the laterally spaced apertures, the wedge mechanism and the recess are in substantial axial alignment, the pin being held in place by a mechanical fit between the difference in diameter between the pin and the indentation.

2. The device of claim 1, wherein the axial alignment for the apertures on the wedge mechanism is in the x-direction.

3. The device of claim 1, wherein the axial direction for the plurality of bearings within the inner portion of the wedge mechanism is in the y-direction.

4. The device of claim 1, wherein the wedge mechanism has an opening in the y-direction.

5. The device of claim 1, wherein the pin is rotated by a knob.

6. The device of claim 5, wherein rotation of the knob is 180 degrees.

7. The device of claim 6, wherein a reverse rotation of the knob can release the pin.

8. The device of claim 1, wherein the pin further comprises a spring mechanism that can be locked with the use of a dovetail slot.

9. The device of claim 1, wherein the pin is further held into place by a difference of diameter between the pin and the indentation and further supported by rotation of a knob.

10. A method for ground engagement using a threadless, hammerless, self-aligning geometric device, the method comprising: inserting a wedge mechanism comprising a semi-flexible buffer that connects a plurality of load bearings that are axially aligned within the center of the wedge mechanism into a rectangular mechanism by aligning laterally spaced holes of the wedge mechanism with laterally spaced holes of a recess in the rectangular mechanism; fastening the wedge mechanism to the rectangular mechanism with a pin that is formed integrally with an indentation, whereby the pin is rotated 180° by a knob to secure the wedge mechanism to the rectangular mechanism, allowing for ground engagement.

\* \* \* \* \*